(12) United States Patent
Kawamoto et al.

(10) Patent No.: US 8,076,611 B2
(45) Date of Patent: Dec. 13, 2011

(54) WELDING DEVICE HAVING A SELECTOR TO DESIGNATE WELDING CONDITIONS

(75) Inventors: Atsuhiro Kawamoto, Hyogo (JP); Yasushi Mukai, Osaka (JP); Junji Fujiwara, Osaka (JP); Masaru Kowa, Osaka (JP)

(73) Assignee: Panasonic Corporation, Osaka (JP)

( * ) Notice: Subject to any disclaimer, the term of this patent is extended or adjusted under 35 U.S.C. 154(b) by 102 days.

(21) Appl. No.: 11/996,552

(22) PCT Filed: Jul. 30, 2007

(86) PCT No.: PCT/JP2007/064867
§ 371 (c)(1),
(2), (4) Date: Jan. 23, 2008

(87) PCT Pub. No.: WO2008/108014
PCT Pub. Date: Sep. 12, 2008

(65) Prior Publication Data
US 2010/0126976 A1 May 27, 2010

(30) Foreign Application Priority Data
Mar. 7, 2007 (JP) ................................. 2007-057014

(51) Int. Cl.
*B23K 9/09* (2006.01)
*B23K 9/095* (2006.01)
*B23K 9/12* (2006.01)

(52) U.S. Cl. ........... 219/125.1; 219/130.21; 219/130.51; 219/136; 219/137.44; 219/137.7

(58) Field of Classification Search ............... 219/125.1, 219/132, 136, 136.61, 137.7
See application file for complete search history.

(56) References Cited

U.S. PATENT DOCUMENTS

| | | | |
|---|---|---|---|
| 5,278,390 A * | 1/1994 | Blankenship | 219/130.5 |
| 6,274,845 B1 * | 8/2001 | Stava et al. | 219/125.12 |
| 6,930,280 B2 | 8/2005 | Zauner et al. | |

(Continued)

FOREIGN PATENT DOCUMENTS

CN 1392020 A 1/2003

(Continued)

OTHER PUBLICATIONS

Chinese Office Action for Application No. 200780000823.2, Sep. 27, 2010, Panasonic Corporation.

(Continued)

*Primary Examiner* — Joseph M Pelham
(74) *Attorney, Agent, or Firm* — RatnerPrestia

(57) ABSTRACT

A welding device includes a welding torch, a memory, a power supply, an input section, a selector, and a controller. The welding torch includes a welding tip having a feeder for supplying electric power to a welding wire. The memory stores a plurality of welding conditions in which a feeder-work-piece to be welded distance is associated with at least one a length of the wire supplied per unit time, a weight of the wire supplied per unit time, and a set electric current. The power supply supplies electric power between the wire and the work-piece. The input section receives an input of a set value of a feeder-work-piece distance. The selector selects one of the welding conditions stored in the memory based on the set value. The controller controls the power supply based on the welding condition selected by the selector.

2 Claims, 3 Drawing Sheets

U.S. PATENT DOCUMENTS

| | | | |
|---|---|---|---|
| 6,943,318 B2 * | 9/2005 | Takagi et al. | 219/137.61 |
| 2002/0088786 A1 * | 7/2002 | Rouault | 219/130.01 |
| 2006/0138116 A1 * | 6/2006 | Lipnevicius | 219/137.71 |

FOREIGN PATENT DOCUMENTS

| | | | |
|---|---|---|---|
| EP | 1 266 714 A1 | | 12/2002 |
| JP | 57062863 A | * | 4/1982 |
| JP | 61186171 A | * | 8/1986 |
| JP | 06-106349 | | 4/1994 |
| JP | 06-106349 A | | 4/1994 |
| JP | 09094667 A | * | 4/1997 |
| JP | 09-122914 | | 5/1997 |
| JP | 2003-285165 A | | 10/2003 |
| JP | 2004-042112 A | | 2/2004 |

OTHER PUBLICATIONS

Canadian Office Action for Application No. 2,642,977, Aug. 23, 2010, Canadian Intellectual Property Office.

Supplementary European Search Report for Application No. EP 07 79 1552, May 3, 2010, Panasonic Corporation.

* cited by examiner

WELDING DEVICE HAVING A SELECTOR TO DESIGNATE WELDING CONDITIONS

This application is a U.S. National Phase Application of PCT International Application PCT/JP2007/064867.

TECHNICAL FIELD

The present invention relates to a welding device which automatically supplies a consumable electrode (hereinafter referred to as a "wire"), and generates arc between the wire and an item to be welded (hereinafter referred to as a "work-piece") to carry out a welding.

BACKGROUND ART

In recent years, the welding market has required increasing a speed of welding or reducing spatters. Welding at a higher speed will increase the number of work-pieces welded, while a reduction of spatters will decrease the number of steps in post treatments to remove spatters attached. Achievement of these requirements allows carrying out a quality welding steadily, which results in improving the welding productivity.

A conventional welding device elaborately controls as many as several hundred types of waveform controlling parameters in order to improve the stability of high quality welding. The waveform controlling parameters have an optimum value for respective welding conditions. Setting of a variety of welding conditions will thus search an appropriate waveform controlling value from a welding condition table stored in a data memory of the welding device for controlling the waveform. The welding condition includes, e.g. a wire diameter, a type of shield gas, a method of welding, a welding current value, or a length of wire supplied per unit time (hereinafter referred to as "wire supplying speed"). The foregoing art is disclosed in, e.g. Reference Patent Document 1.

However, an operator in the field must adjust a distance between a feeder of a welding tip and a work-piece (hereinafter referred to as a feeder-work-piece distance). This distance is one of important factors for selecting a waveform controlling parameter. A welding device manufacturer thus sets a feeder-work-piece distance of general purpose, then selects a waveform controlling parameter, and stores it in the welding condition. This is done in general among the welding device manufacturers.

For instance, when a target spot to be welded of a work-piece is close to a welding jig in the field, the welding jig sometimes interferes with (or hits) a welding torch. In this case, the torch must remove from the work-piece in order to avoid the interference. Then an actual feeder-work-piece distance sometimes becomes longer than the set one. When a gap exists between the work pieces, it is necessary to reduce a deviation from a welding target as little as possible. In such a case, an actual feeder-work-piece distance sometimes becomes shorter than the set one.

In these cases discussed above, although the feeder-work-piece distance is changed, the welding condition remains unchanged. Use of a welding wire having a higher resistance such as soft steel or stainless steel will greatly change a resistance at a welding output path in response to a change in the feeder-work-piece distance. A wire supplying speed is thus not changed, but an output current or an appropriate welding voltage is changed, so that the welding cannot be done properly. That is because the welding waveform parameters have been set in conjunction with respective wire supplying speeds or respective set values of welding current. For instance, when the actual feeder-work-piece distance becomes greater than the set one, the output welding current decreases, and the waveform controlling parameter stays unchanged although the current decreases. As a result, the spatters increase. On top of that, a voltage corresponding to the prolonged section of the welding wire is not supplied, so that the welding voltage becomes short, and as a result, the arc becomes unstable.

The welding cannot be done appropriately not only in a main welding period but also at arc starting time, so that the arc becomes unstable at the arc starting time, and it takes a time before the arc becomes stable.

Reference Patent Document 1: Unexamined Japanese Patent Publication No. H09-122914

DISCLOSURE OF INVENTION

The present invention aims to provide a welding device capable of achieving a quality welding as well as carrying out the welding in a stable manner even when a feeder-work-piece distance differs with the welding fields.

The welding device of the present invention includes the following elements: a welding torch; a memory; a power supply; an input section; a selector; and a controller. The welding torch includes a welding tip that has a power feeder for supplying power to a welding wire. The memory stores a plurality of welding conditions in which the feeder-work-piece distance is associated with at least one of a length of welding wire supplied per unit time, a weight thereof, or a set electric current. The power supply supplies electric power between the welding wire and a work-piece. The input section receives an input of a set value of the feeder-work-piece distance. The selector selects one of the welding conditions stored in the memory based on the set value. The controller controls the power supply based on the welding condition selected by the selector.

The memory may store a computing equation which shows an association between the feeder-work-piece distance and at least one of the length of welding wire supplied per unit time or a weight thereof. In this case, the input section receives a set value of the feeder-work-piece distance, and the selector calculates a welding condition based on the computing equation stored in the memory and the input set value.

When the welding tip is provided nearer to the work-piece than the feeder, and includes an insulating member having a through hole in order to insert the wire, the welding device may be constructed as follows: The memory stores a plurality of welding conditions associated with the lengths of the insulating member along the through hole. The input section receives an input of a set value of the length of the insulating member along the through hole. The selector selects one of the welding conditions based on the set value of the length along the through hole.

The welding device also may be constructed in the following manner: The memory stores a plurality of welding conditions associated with at least one of a length of a projected section of the welding wire from the feeder or identifying information of a welding tip. The input section receives an input of at least one of a set value of the projected length of the welding wire from the feeder or the identifying information of the welding tip. The selector selects one of the welding conditions based on at least one of the set value of the projected length of the welding wire from the feeder or the identifying information, which is supplied from the input section, of the welding tip.

The welding device of any one of the constructions discussed above can carry out a welding under the welding condition in response to the feeder-work-piece distance even when this distance changes.

Figure 1:
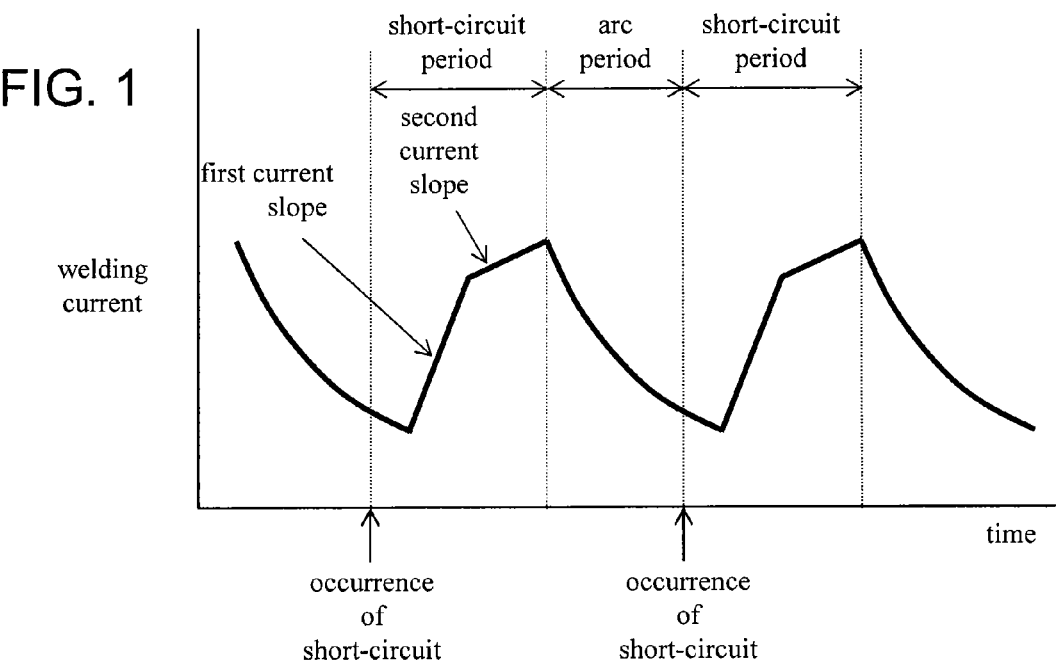
FIG. 1 shows an instance of changes in welding current time.

DESCRIPTION OF REFERENCE MARKS 1 welding unit
2 power supply
3 input section
4 memory
5 selector
6 controller
7 welding torch
8, 8A welding tip
9 work-piece
10 wire
11 wire supplier
12, 12A, 12B feeder-work-piece distance
13 sheath
14 feeder
14A, 15A through hole
15 insulating member

PREFERRED EMBODIMENT FOR CARRYING OUT THE INVENTION

Exemplary Embodiment 1

Before describing the welding device in accordance with the embodiment, the reason is explained with reference to FIG. 1 and Tables 1-4 why a welding condition in response to a feeder-work-piece distance of a welding tip must be used when the distance is different. FIG. 1 shows an instance of changes in welding current with time.

TABLE 1

| set value of current (A) | wire supplying speed (meter/minute) | recommended voltage (V) | waveform controlling parameter first slope of current (A/ms) |
|---|---|---|---|
| 150 | 4 | 16 | 80 |
| 200 | 6 | 19 | 110 |
| 250 | 8 | 24 | 160 |

Table 1 shows an instance of a set value of the welding condition in the following case: MAG welding of soft steel; wire diameter of 1.2 mm; and feeder-work-piece distance of 15 mm. When a welding current is set as table 1 shows, other parameters for waveform control are determined as shown in table 1. For instance, the welding current is set at 150 A, then a wire supplying speed is determined at 4 m/minute, a recommended welding voltage is determined at 16V, and a first current slope is determined at 80 A/ms. The first current slope during a short-circuit period is one of the parameters for waveform control, and as shown in FIG. 1, the slope indicates an increase of the current due to current control done in the short-circuit period.

The total number of waveform controlling parameters differs depending on welding devices, and it sometimes amounts to as many as several-hundred items. All the parameters and the recommended set voltage are set to be optimum values considering the welding current, a welding method or the like. For instance, these values are set at optimum ones for the welding carried out with 150 A. Optimum values are also selected to the first current slope during the short-circuit period for maintaining both of spatter production and arc stability.

The waveform controlling parameter and the recommended voltage are set appropriate for the welding with welding current 150 A, so that an output of the welding current must be around 150 A, otherwise the welding cannot be done properly.

The set value of welding current and the wire supplying speed shown in Table 1 are used when a feeder-work-piece distance is 15 mm. This means that the wire supplying speed is determined such that the welding current should output 150 A when the feeder-work-piece distance is set at 15 mm.

TABLE 2

| | output value | | | |
|---|---|---|---|---|
| set value current (A) | current (A) | wire-supply speed (m/分) | recommend voltage (V) | waveform controlling parameter first current slope (A/ms) |
| 150 | 145~155 | 4 | 16 | 80 |
| 200 | 195~205 | 6 | 19 | 110 |
| 250 | 245~255 | 8 | 24 | 160 |

Table 2 shows the welding output values at 15 mm distance between the feeder and the work-piece with the set values kept as shown in table 1. The output current takes approximately the same value as the set welding current, so that an excellent bead outlook is obtainable in any condition, and the arc starts well and the amount of spatter is small.

TABLE 3

| | output value | | | |
|---|---|---|---|---|
| set value Current (A) | Current (A) | wire supply speed (m/minute) | Recommend voltage (V) | Waveform controlling Parameter first current slope (A/ms) |
| 150 | 100~110 | 4 | 16 | 80 |
| 200 | 150~160 | 6 | 19 | 110 |
| 250 | 195~205 | 8 | 24 | 160 |

Table 3 shows the welding output values at 30 mm distance between the feeder and the work-piece with the set values kept as shown in FIG. 1. The output current lowers from the set values by 40-60 A. In this condition, although the feeder-work-piece distance is prolonged, the welding voltage remains unchanged, so that the welding voltage becomes short. As a result, in any condition, it takes time to stabilize the arc after the arc start, and unstable arc is kept during this period. The set values of the waveform controlling parameters are not appropriate for the welding output current, so that the production of spatter increases.

TABLE 4

| | output value | | | |
|---|---|---|---|---|
| set value current (A) | current (A) | wire supply speed (m/minute) | recommend voltage (V) | waveform controlling parameter first current slope (A/ms) |
| 150 | 100~110 | 4 | 19 | 60 |
| 200 | 150~160 | 6 | 22 | 80 |
| 250 | 195~205 | 8 | 27 | 110 |

Table 4 shows the output values at 30 mm distance between the feeder and the work-piece with the optimum welding condition and the optimum waveform controlling parameter. Under these conditions, excellent welding bead outlook is obtained and a less amount of spatter is produced, which results in an excellent welding. As discussed above, selection of an optimum welding condition in response to the feeder-work-piece distance allows carrying out an excellent welding. It is thus desirable to carry out a welding under a welding condition in response to a feeder-work-piece distance appropriate in the present field when the feeder-work-piece distance is different.

Figure 2:
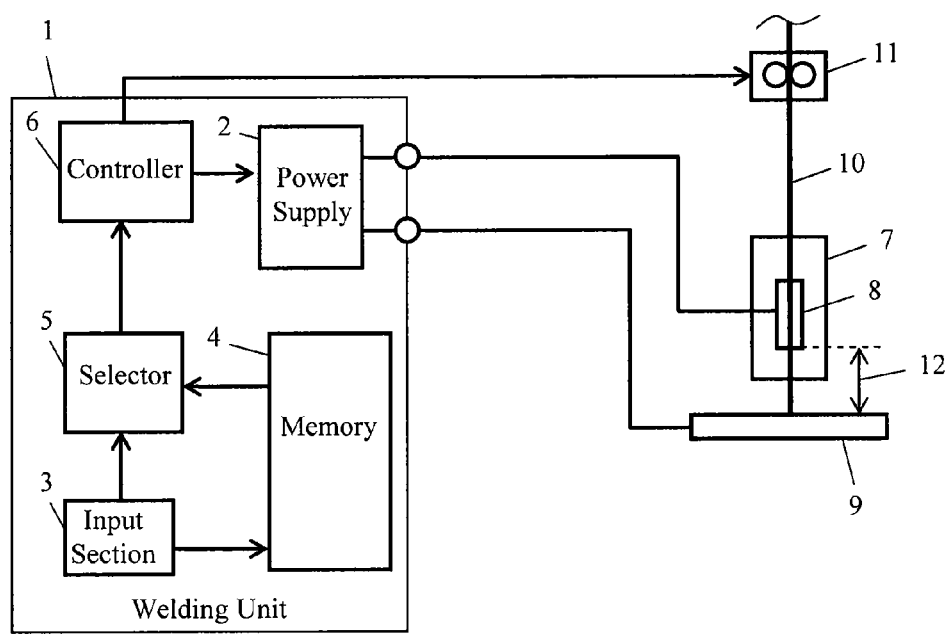
FIG. 2 shows a schematic structure of a welding device in accordance with an embodiment of the present invention.
Figure 3:
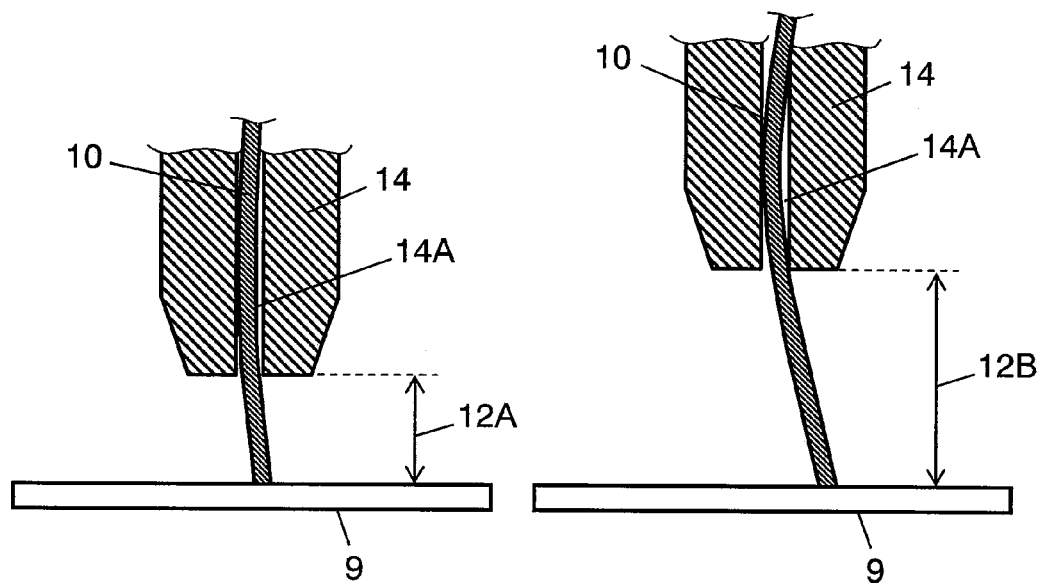
FIG. 3 shows a target position of a wire in accordance with an embodiment of the present invention.

A welding device of the present invention is demonstrated hereinafter with reference to the accompanying drawings. FIG. 2 shows a schematic structure of an arc welding device in accordance with this embodiment. FIG. 3 shows an enlarged view of a section where work-piece 9 to be welded touches welding wire 10 working as a consumable electrode. Welding unit 1 includes power supply 2, input section 3, memory 4, selector 5, controller 6, welding torch 7, and wire supplier 11.

Power supply 2 supplies electric power between wire 10 and work-piece 9. Input section 3 receives an input of a set value of distance between feeder 14 and work-piece 9 (feeder-work-piece distance 12). Memory 4 stores a plurality of welding conditions. Selector 5 selects one of the welding conditions stored in memory 4. Controller 6 controls power supply 2 based on the welding condition selected by selector 5.

Welding torch 7 includes welding tip 8 having feeder 14 and being electrically coupled to a first end of an output of power supply 2. Feeder 14 is one of the elements of welding tip 8 and has through hole 14A in order to insert wire 10. Feeder 14 supplies electric power to wire 10. Work-piece 9 is coupled to a second end of the output of power supply 2. Wire supplier 11 supplies wire 10.

Operation of the foregoing arc welding device is demonstrated hereinafter. Memory 4 stores a plurality of welding conditions in response to various feeder-work-piece distances 12. The welding condition includes conditional values of a supply speed of wire 10 or a recommended voltage. Other than these values, the welding condition may include a set voltage of feeder 14, a set current, a type of shield gas, and a type and a diameter of wire 10. Instead of the supplying speed of wire 10, the condition may include a weight of wire 10 supplied per unit time. To be more specific, memory 4 stores the welding conditions in which a distance between feeder 4 and work-piece 9 is associated with at least one of a length of wire 10 supplied per unit time, a weight thereof supplied per unit time, or a set current.

Selector 5 selects and retrieves a welding condition from memory 4 in response to a set value of feeder-work-piece distance 12 supplied from input section 3. This action prompts setting many waveform controlling parameters such as an appropriate supplying speed of wire 10 or a recommended voltage in response to a set welding current. Then controller 6 controls power supply 2 based on the welding condition selected by selector 5, thereby carrying out an excellent welding.

As discussed above, the welding device of the present invention has memory 4 that stores welding conditions each one of which is optimum to respective feeder-work-piece distances 12 different from each other. Selector 5 selects a welding condition based on a supplied set value of feeder-work-piece distance 12. This structure allows a user to keep using one welding device and carry out an excellent welding even when feeder-work-piece distance 12 differs with the welding fields, so that the user does not need to prepare another welding device. In other words, using one welding device, the user can achieve an excellent bead outlook, and carry out a quality welding with a little amount of spatter.

The foregoing embodiment is only an example, and the welding conditions discussed above are set based on a set value of welding current; however, the present invention is not limited to this example. For instance, the welding conditions may be set based on a supplying speed of wire 10.

The foregoing embodiment shows a case where each one of structural elements such as selector 5 and controller 6 are prepared discretely, however, the present invention is not limited to this case. For instance, a plurality of functions such as selection and control may be done by one element, so that a welding device may be constructed using such an element having a plurality of functions.

Next, an influence of feeder-work-piece distance 12, i.e. the distance along the supplying direction of wire 10 from the feeder end of welding tip 8 to the surface of work-piece 9, is described with reference to FIG. 3.

When feeder-work-piece distance 12 becomes longer one, i.e. feeder-work-piece distance 12B as shown in the right side drawing from feeder-work-piece distance 12A as shown in the left side drawing, the end position of wire 10 deviates from the lower section of through hole 14A of feeder 14. This deviation of the end of wire 10 causes deviating a welding spot. Shielding by a nozzle and shield gas (both are not shown) also becomes poor, so that the arc becomes unstable. Thus, in general, feeder-work-piece distance 12 should not become so long. Feeder-work-piece distance 12 does not take so many various values, but it is, in general, set at one value, and then a waveform controlling parameter is selected.

Figure 4:
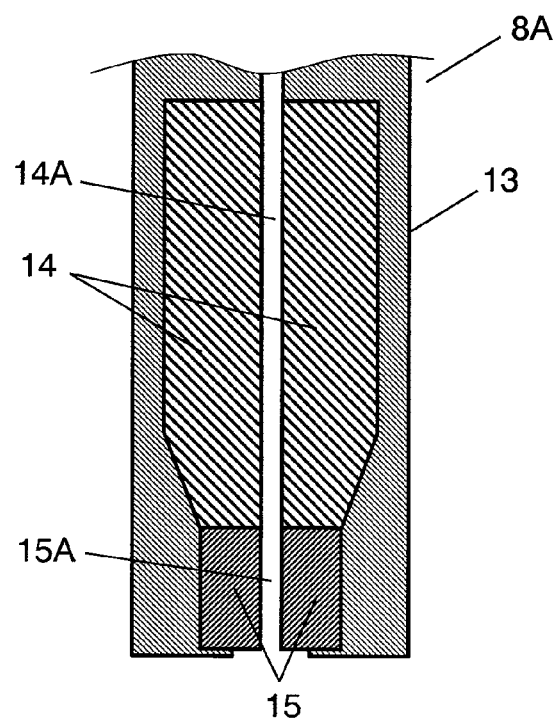
FIG. 4 shows a sectional view illustrating a schematic structure of another welding tip in accordance with an embodiment of the present invention.

However, use of welding tip 8A shown in sectional view of FIG. 4 allows suppressing the inconvenience such as the deviation of target spot and the poor shielding discussed above. Welding tip 8A includes feeder 14, insulating member 15, and sheath 13. Feeder 14 has through hole 14A in order to insert wire 10 and supplies electric power to wire 10. Insulating member 15 has through hole 15A in order to insert wire 10, and is placed nearer to work-piece 9 than feeder 14. Sheath 13 is made of, e.g. insulating resin or metal, and covers feeder 14 as well as insulating member 15. Sufficient mechanical joint between feeder 14 and insulating member 15 will allow eliminating sheath 13.

A change in feeder-work-piece distance 12 due to the use of welding tip 8A influences the end of wire 10. This influence is described hereinafter with reference to FIGS. 5 and 6, which illustrate a target spot of wire 10 when welding tip 8A is used and another target spot of wire 10 when welding tip 8A is not used.

Figure 5:
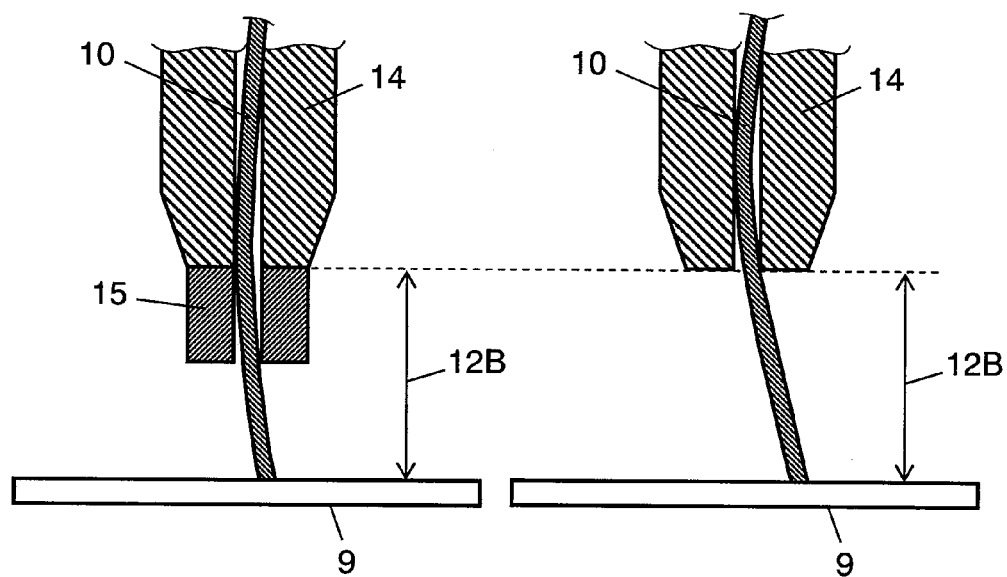
FIG. 5 shows a target position of a wire when the welding tip shown in FIG. 4 is used.

Welding tip 8A has insulating member 15 functioning as a guide to wire 10, so that placement of welding 8A as shown in FIG. 5 allows a target spot of wire 10 to deviate not so much even when feeder-work-piece distance 12B is set longer than feeder-work-piece distance 12A shown in FIG. 3. The shielding done by shield gas also does not become poor.

Figure 6:
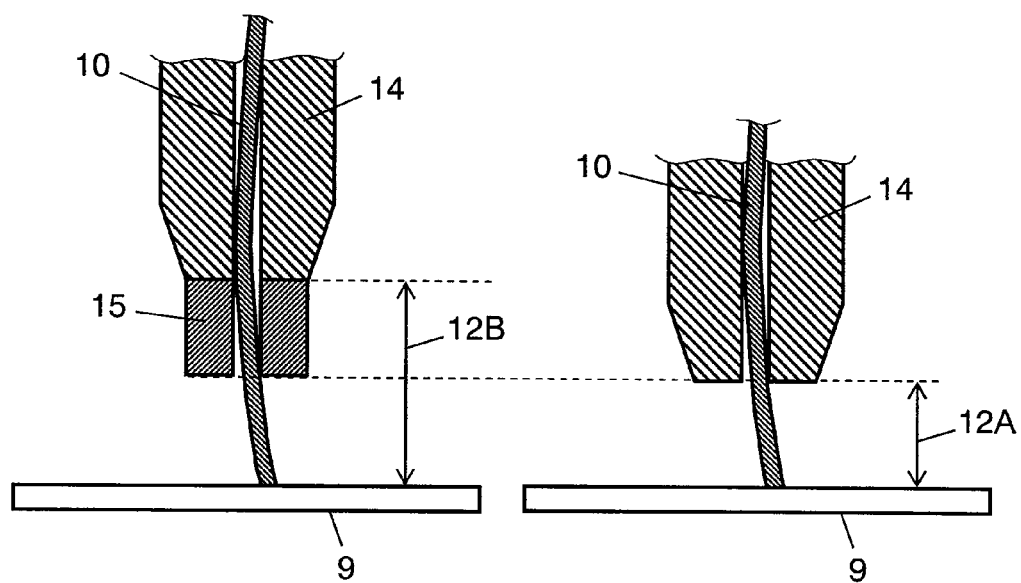
FIG. 6 shows a target position of a wire when the welding tip shown in FIG. 4 is used.

To the contrary, placement of welding tip 8A as shown in FIG. 6 allows providing feeder-work-piece distance 12B longer than feeder-work-piece distance 12A with the same accuracy of the target spot being kept. A longer feeder-work-piece distance 12 generates greater resisting heat due to the current running through wire 10, so that wire 10 tends to melt, which results in deeper weld penetration and wider bead in addition to a higher speed of the welding.

Changes in the length of insulating member 15 along through hole 15A allow changing feeder-work-piece distance 12. As discussed above, different types of welding tip 8A can be used for different types of welding. In such a case, although feeder-work-piece distance 12 changes in various ways, the welding device in accordance with this embodiment stores a plurality of welding conditions optimized in response to different feeder-work-piece distances 12, so that an appropriate welding condition can be selected based on a set value of feeder-work-piece distance 12. This welding device is thus very useful.

As discussed above, the set value of feeder-work-piece distance 12 can be changed depending on the length of insulating member 15, so that memory 4 may store a plurality of welding conditions associated with the length of insulating member 15 along through hole 15A instead of or in addition to the value of distance 12. In this case, input section 3 further receives an input of a set value of the length of insulating member 15 along through hole 15A. Selector 5 selects one of the welding conditions based on the set value of the length of insulating member 15. The foregoing structure is also workable.

Here is another structure: Various welding tips 8A, whose identifying information differs from each other, are prepared for replacement. The identifying information includes, e.g. a type number or a product code assigned to welding tips 8A according to the presence/absence or the length of insulating member 15. In this case, memory 4 may store a plurality of welding conditions associated with the identifying information of welding tips 8A instead of or in addition to feeder-work-piece distance 12. In the case of welding tip 8 having no insulating member 15 in particular, a projected length of wire 10 generally changes in response to a change in feeder-work-piece distance 12. Memory 4 thus may store a plurality of welding conditions associated with the projected length of wire 10 instead of or in addition to feeder-work-piece distance 12.

As discussed above, memory 4 may store the plurality of welding conditions associated with at least one of the length of wire 10 projected from feeder 14 or the identifying information of welding tips 8A. In this case, input section receives at least one of inputs of a set value of the length of wire 10 projected from feeder 14 or the identifying information of welding tips 8A. Selector 5 selects one of the welding conditions based on at least one of the set value of the length of wire 10 projected from feeder 14 or the identifying information of welding tips 8A, meanwhile, those value and information have been supplied from the input section. The foregoing structure is also workable.

Next, the case where the values of feeder-work-piece distance 12 stored in memory 4 do not agree with a set value of feeder-work-piece distance 12 supplied from input section 3 is described hereinafter.

In such a case, selector 5 selects a welding condition in response to feeder-work-piece distance 12 having the smallest difference from a set value of feeder-work-piece distance 12. For instance, assume that memory 4 stores the welding conditions in response to 15 mm and 20 mm of feeder-work-piece distance 12. Then input section 3 supplies 19 mm as a set value of feeder-work-piece distance 12. Selector 5 finds a difference between the input set value of 19 mm and stored values of 15 mm, 20 mm, and determines that the stored value of 20 mm has a smaller difference. Selector 5 then selects the welding condition in response to 20 mm of distance 12, and outputs the selected distance to controller 6.

As shown in the foregoing case, there is a case where a set value supplied from input section 3 differs from any distance associated with a plurality of welding conditions stored in memory 4. In such a case, selector 5 selects a welding condition in response to the distance having the smallest difference from the set value. This selection allows controller 6 to determine and carry out an appropriate welding condition.

Different structures of memory 4 are demonstrated hereinafter. In the previous description, memory 4 stores a plurality of welding conditions; however, in stead of the welding conditions, memory 4 stores computing equations showing a relation between respective waveform controlling parameters found by experiments and at least the feeder-work-piece distance. Then selector 5 calculates various waveform controlling parameters based on the set values, which are supplied from input section 3, of feeder-work-piece distance. Selector 5 then calculates a welding condition and outputs it to controller 6, which controls power supply 2 based on this welding condition. The welding condition preferably includes at least one of a length of wire 10 supplied per unit time or a weight of wire 10 supplied per unit time.

The structure discussed above allows memory 4 not to store a table containing the welding conditions in response to various feeder-work-piece distances 12, so that memory 4 can reduce its memory capacity. In addition, the welding conditions can be found by calculations, so that a welding condition can be found appropriately to a variety of set values of feeder-work-piece distances 12, and an optimum welding can be carried out. Memory 4 can store both of a plurality of welding conditions and computing equations, and the user may use either one of them appropriately depending on an application.

INDUSTRIAL APPLICABILITY

An arc welding device of the present invention can carry out a welding in response to a distance between a feeder of a welding tip and a work-piece even when the distance changes in the field. The welding device thus allows carrying out a quality welding and achieving a stable welding. The welding device is useful particularly for carrying out an arc welding which generates arc between a work-piece and a consumable electrode supplied automatically.

The invention claimed is:

1. A welding device comprising:
   a welding torch including:
      a welding tip having a feeder for providing a welding wire; and
      an insulating member disposed nearer to a work-piece to be welded than the feeder and having a through hole in order to insert the welding wire;
   a memory that stores a plurality of welding conditions including a welding current waveform controlling parameter including a current slope during a short-circuit period associated with a length of the insulating member along the through hole;

a power supply that supplies electric power between the feeder and the work-piece;

an input section that receives an input of a set value of the length of the insulating member along the through hole;

a selector that selects one of the plurality of welding conditions based on the set value of the length of the insulating member along the through hole; and a controller in communication with the selector, the controller operable to control the power supply based on the welding condition selected by the selector.

2. The welding device of claim 1, wherein the memory further stores at least one of a length of the welding wire projected from the feeder and identifying information of the welding tip associated with the plurality of welding conditions, wherein the input section further receives an input of at least one of a set value of the length of the welding wire projected from the feeder and the identifying information of the welding tip, and wherein the selector selects one of the plurality of welding conditions based on at least one of the set value of the length of the welding wire projected from the feeder and the identifying information, which is supplied from the input section, of the welding tip.

* * * * *